(12) United States Patent
Toda (10) Patent No.: US 6,275,713 B1
(45) Date of Patent: Aug. 14, 2001

(54) CELLULAR PHONE WITH AUTOMATIC CALL REESTABLISHMENT

(75) Inventor: Toshiyuki Toda, Kanagawa (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/080,777

(22) Filed: May 18, 1998

(30) Foreign Application Priority Data

May 23, 1997 (JP) ........................................ 9-148441

(51) Int. Cl.⁷ ........................................ H04B 1/38
(52) U.S. Cl. ........................ 455/564; 455/460; 455/550
(58) Field of Search ........................ 455/564, 569, 455/550, 460; 379/216, 355, 359

(56) References Cited

U.S. PATENT DOCUMENTS 5,239,571  8/1993  Takahashi ........................ 379/58

FOREIGN PATENT DOCUMENTS

| 526 240 A2 | 2/1993 | (EP) . |
| 05-276101 | 10/1993 | (JP) . |
| 05-276103 | 10/1993 | (JP) . |

OTHER PUBLICATIONS

WO 94/28689, International Publication Date: Dec. 8, 1994.
Japio Abstract JP 5276101 A & JP 5276101 A (Mitsubishi) Oct. 22, 1993.
Japio Abstract JP 5276103 A & JP 5276103 A (Mitsubishi) Oct. 22, 1993.

*Primary Examiner*—Lee Nguyen
(74) *Attorney, Agent, or Firm*—Pearne & Gordon LLP (57) ABSTRACT

A cellular phone which, when a communication channel is disconnected because of deterioration of field strength while a call is in progress, waits for recovery of the field strength and reinitiates a call. The cellular phone includes telephone number storage means 12 for storing a telephone number of a called party when originating a call or storing a telephone number of a calling party when receiving an incoming call; number-for-call-reestablishment registration means 13 for storing a telephone number of the called/calling party input by the user; and call reestablishment processing means 14 for automatically reinitiating a call by dialing the telephone number stored in the telephone number storage means or the number-for-call-reestablishment registration means. Even when the cellular phone receives an incoming call, the telephone unit automatically reinitiates a call if the telephone unit has received the telephone number of the calling party. In contrast, even when the telephone unit has not received the telephone number from the calling party, the telephone unit automatically reinitiates a call at a point in time when the field strength recovers to its original state by dialing the telephone number of the calling party registered by the user.

17 Claims, 11 Drawing Sheets

CELLULAR PHONE WITH AUTOMATIC CALL REESTABLISHMENT

BACKGROUND OF THE INVENTION

The present invention relates to a cellular phone which communicates over a radio channel, and more particularly, to a cellular phone capable of smoothly reinitiating a call after disconnection of the radio channel.

A cellular phone which communications over a radio channel disconnects the channel when the telephone unit becomes incapable of communicating as a result of a drop in the field strength. Japanese-Patent Publication 5-276101 describes a cellular phone which terminates the call when there is a drop in the field strength and reinitiates a call when the field strength recovers to its original state.

Further, Japanese Patent Publication 5-276103 describes a cellular phone which, when the channel is disconnected, reinitiates a call by pressing a one-touch call reestablishment button. Until a predetermined period of time lapses after pressing of the one-touch button, the cellular phone automatically reinitiates the call every time the channel is disconnected. After lapse of the predetermined period of time, a call is not reinitiated unless the one-touch button is pressed again.

When a conventional telephone unit receives an incoming call, the telephone unit does not reinitiate the call even if the field strength recovers to its original state. For example, even if the telephone unit at the receiving end (hereinafter simply referred to as a "receiver telephone unit") assumes a responsibility for the deterioration of the field strength, e.g., when the receiver telephone unit is passing through a tunnel, and if the receiver telephone unit is capable of identifying whether or not the field strength is restored to its previous state by having finished passing through the tunnel, call reestablishment must be waited until the call originator reinitiates the call, thus delaying call reestablishment. If the call originator terminates call reestablishment while the channel is in a disconnected state, the call cannot be reinitiated unless the user of the receiver telephone unit dials the telephone number of the call originator.

Since the conventional cellular phone automatically reinitiates the call depending on whether or not the field strength has been restored without reference to the will of the user, there sometimes arises a case where the user leaves the telephone unit aside without knowing the fact that the channel was reconnected to the call originator.

If the field strength is not recovered for a long period of time after disconnection of the channel, there may arise a case where the user forgets that his telephone is waiting for call reestablishment after disconnection of the line.

SUMMARY OF THE INVENTION

The present invention is intended to solve the problems in the prior art such as those described above, and the object of the present invention is to provide a cellular phone capable of smoothly reinitiating a call after disconnection of a radio channel.

To this end, a cellular phone according to the present invention comprises telephone number storage means for storing a telephone number of a called party when originating a call or storing a telephone number of a calling party when receiving an incoming call; number-for-call-reestablishment registration means for storing a telephone number of the called/calling party input by the user; and call reestablishment processing means for automatically reinitiating a call by dialing the telephone number stored in the telephone number storage means or the number-for-call-reestablishment registration means.

With the foregoing configuration, even when the cellular phone receives an incoming call, the telephone unit automatically reinitiates a call if the telephone unit has received the telephone number of the calling party. In contrast, even when the telephone unit has not received the telephone number from the calling party, the telephone unit automatically reinitiates a call at a point in time when the field strength recovers to its original state by dialing the telephone number of the calling party registered by the user.

A cellular phone according to the present invention comprises telephone number storage means for storing a telephone number of a called party when originating a call or storing a telephone number of a calling party when receiving an incoming call; call reestablishment processing means for automatically reinitiating a call by dialing the telephone number stored in the telephone number storage means; call reestablishment notification means for notifying the user of call reestablishment before a call is reinitiated; and call reestablishment control means for causing the call reestablishment processing means to reinitiate a call when the user instructs the call reestablishment control means to reinitiate a call and for causing the call reestablishment processing means to abort call reestablishment when the user does not instruct the call reestablishment control means to call reestablishment.

With the foregoing configuration, the user is capable of determining whether to reinitiate a call at his will.

A cellular phone according to the present invention comprises telephone number storage means for storing a telephone number of a called party when originating a call or storing a telephone number of a calling party when receiving an incoming call; call reestablishment processing means for automatically reinitiating a call by dialing the telephone number stored in the telephone number storage means; timer means for measuring the time that elapses from disconnection of the communication channel; and call reestablishment abort means for causing the call reestablishment processing means to abort call reestablishment when the field strength does not recover to its original state within a given period of time.

With the foregoing configuration, call reestablishment would be aborted unless field-strength restores to its original state within a given period of time.

First aspect of the present invention is directed to a cellular phone which, when a communication channel is disconnected because of deterioration of field strength while a call is in progress, waits for recovery of the field strength and reinitiates a call, the cellular phone comprising: telephone number storage means for storing a telephone number of a called party when originating a call or storing a telephone number of a calling party when receiving an incoming call; number-for-call-reestablishment registration means for storing a telephone number of the called/calling party input by the user; and call reestablishment processing means for automatically reinitiating a call by dialing the telephone number stored in the telephone number storage means or the number-for-call-reestablishment registration means. Even in a case where the telephone unit receives an incoming call, the telephone unit is capable of reinitiating a call if the cellular phone receives the telephone number of the calling party. In contrast, even if the telephone unit is not notified of the telephone number of the calling party, the telephone unit is capable of reinitiating a call when the field strength recovers to its original state by dialing the telephone number of the calling party entered by the user.

Second aspect of the present invention is directed to a cellular phone which, when a-communication channel is disconnected because of deterioration of field strength while a call is in progress, waits for recovery of the field strength and reinitiates a call, the cellular phone comprising: telephone number storage means for storing a telephone number of a called party when originating a call or storing a telephone number of a calling party when receiving an incoming call; call reestablishment processing means for automatically reinitiating a call by dialing the telephone number stored in the telephone number storage means; and notification means for notifying the user of the telephone number of the calling party being not received therefrom when an incoming call is received from the calling party. The user is capable of being aware of that his telephone unit cannot reinitiate a call because the telephone unit is not notified of the telephone number of the calling party.

Third aspect of the present invention is directed to a cellular phone which, when a communication channel is disconnected because of deterioration of field strength while a call is in progress, waits for recovery of the field strength and reinitiates a call, the cellular phone comprising: telephone number storage means for storing a telephone number of a called party when originating a call or storing a telephone number of a calling party when receiving an incoming call; call reestablishment processing means for automatically reinitiating a call by dialing the telephone number stored in the telephone number storage means; call reestablishment notification means for notifying the user of call reestablishment before a call is reinitiated; and call reestablishment control means for causing the call reestablishment processing means to reinitiate a call when the user instructs the call reestablishment control means to reinitiate a call and for causing the call reestablishment processing means to abort call reestablishment when the user does not instruct the call reestablishment control means to call reestablishment. Call reestablishment would be aborted unless there is any instruction from the user.

Fourth aspect of the present invention is directed to a cellular phone which, when a communication channel is disconnected because of deterioration of field strength while a call is in progress, waits for recovery of the field strength and reinitiates a call, the cellular phone comprising: telephone number storage means for storing a telephone number of a called party when originating a call or storing a telephone number of a calling party when receiving an incoming call; call reestablishment processing means for automatically reinitiating a call by dialing the telephone number stored in the telephone number storage means; timer means for measuring the time that elapses from disconnection of the communication channel; and call reestablishment abort means for causing the call reestablishment processing means to abort call reestablishment when the field strength does not recover to its original state within a given period of time. Call reestablishment would be aborted unless the field strength recovers to its original state within a given period of time after disconnection of the communication channel.

Further, according to the present invention, the cellular phone further comprises timer means for measuring the time that elapses from disconnection of the communication channel; and call reestablishment abort means for causing the call reestablishment processing means to abort call reestablishment when the field strength does not recover to its original state within a given period of time. The telephone unit would abort call reestablishment unless the field strength restores to its original state within a given period of time.

Furthermore, according to the present invention, the cellular phone further comprises wait-time-for-abort setting means for setting the time that lapses before call reestablishment is aborted. The user can arbitrarily set the time that elapses before call reestablishment is aborted after disconnection of the communication channel.

Moreover, the cellular phone further comprises abort-time-up notification means for notifying the user of abortion of call reestablishment when call reestablishment is aborted. The user can be notified of the time of abortion of call reestablishment being up.

Still further, according to the present invention, the cellular phone is characterized by the feature that the timer means continues measuring the time that lapses from when the communication channel is disconnected even during the period of time over which power to the main body of the cellular phone is shut off. Even if the power to the cellular phone is shut off in order to save power consumption, the timer means is capable of continually measuring the time of abortion of call reestablishment.

DETAILED DESCRIPTION OF THE PREFERRED EMBODIMENTS

With reference to the accompanying drawings, preferred embodiments of the present invention will be described hereinbelow.

(First Embodiment)

Figure 1:
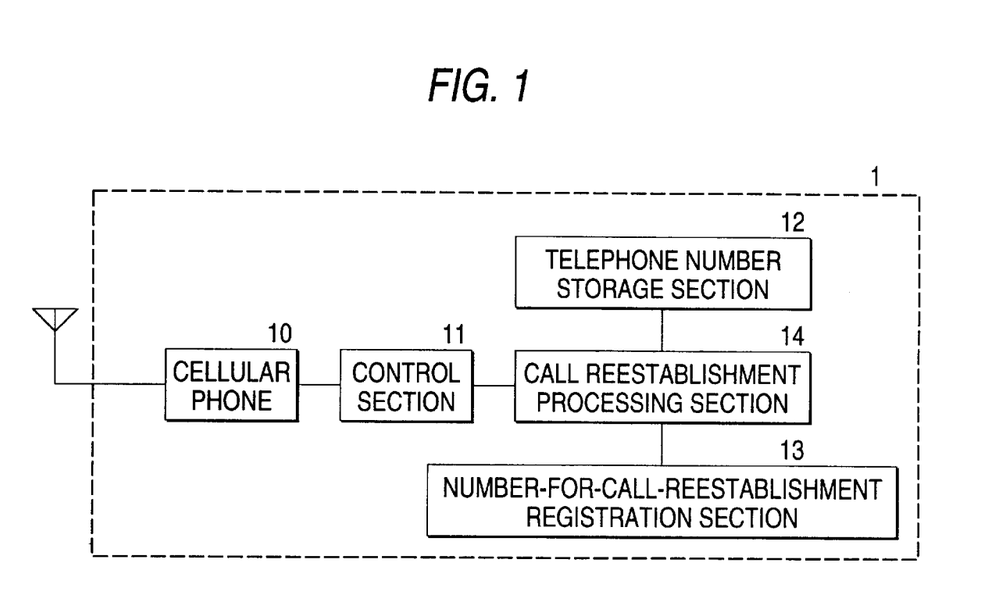
FIG. 1 is a block diagram showing the configuration of a cellular phone according to a first embodiment of the present invention.

As shown in FIG. 1, a cellular phone according to a first embodiment of the present invention comprises a radio section 10 which modulates a signal to be transmitted or demodulates a received signal; a control section 11 which controls the radio section 10 so as to perform origination of a call, receipt of an incoming call, or communication; a telephone number storage section 12 (hereinafter simply referred to as a "storage section") which stores a telephone number of a called party at the time of origination of a call and which stores a telephone number of a calling party received therefrom together with an incoming call; a number-for-call-reestablishment registration section 13 (hereinafter simply referred to as a "registration section") for storing a telephone number of a calling/called party which is registered by the user and which requires call reestablishment; and a call reestablishment processing section 14 (hereinafter simply referred to as a "processing section") which automatically reinitiates a call.

Figure 2A:
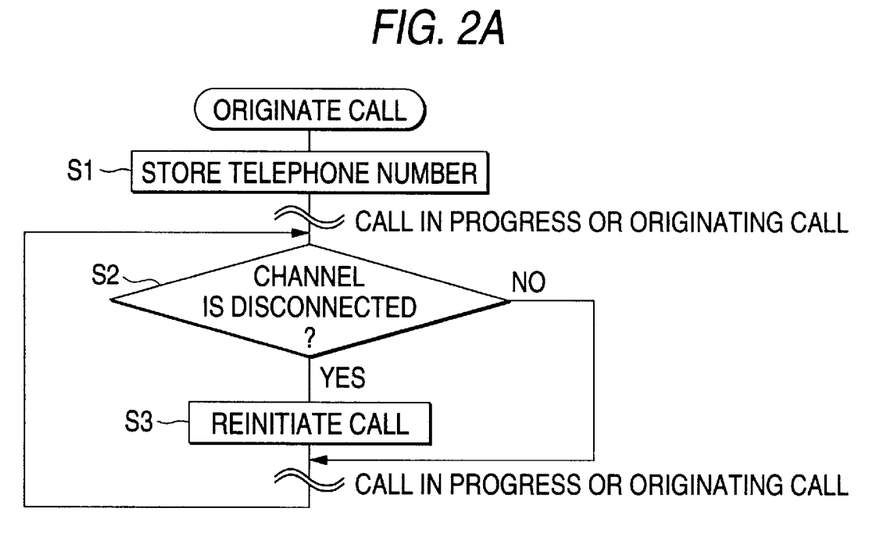
FIGS. 2A and 2B are flowcharts showing procedures for call reestablishment when the cellular phone according to the first embodiment originates a call.

The operation of the foregoing cellular phone will now be described. In a case where the telephone unit receives an incoming call, the telephone unit reinitiates a call, following procedures shown in FIGS. 2A or 2B. FIG. 2A shows procedures set so as to cause the telephone unit to immediately reinitiate a call after disconnection of a radio channel.

Step 1: When there is an entry of a telephone number of a receiving party at the time of origination of a call, the thus-received telephone number is stored in the storage section 12.

Step 2: If the radio channel is disconnected during the origination of a call or while a call is in progress, Step 3: the processing section 14 reinitiates a call by dialing the telephone number of the called party stored in the storage section 12.

Figure 2B:
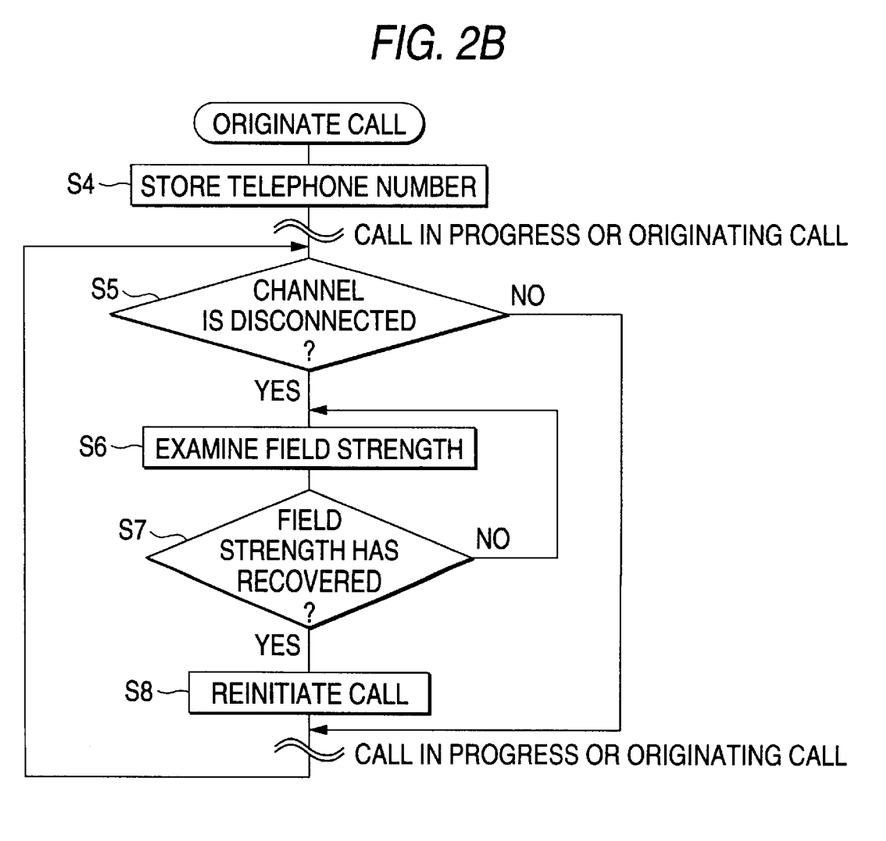

If the procedures are set so as to cause the telephone unit to reinitiate a call after recovery of the field strength, the telephone unit executes the steps shown in FIG. 2B, namely, Step 4: The storage section 12 stores the telephone number of the called party that has been input at the time of origination of a call.

Step 5: If the radio channel is disconnected during the origination of a call or while a call is in progress, Step 6: information received from the radio section 10 is transmitted to the processing section 14 by way of the section 11, and the processing section 14 conducts a study on the state of field strength on the basis of the thus-received information;

Step 7: If the processing section 14 decides that the field strength has recovered to its original state, Step 8: the processing section 14 reinitiates a call by dialing the telephone number of the called party stored in the storage section 12.

Figure 4A:
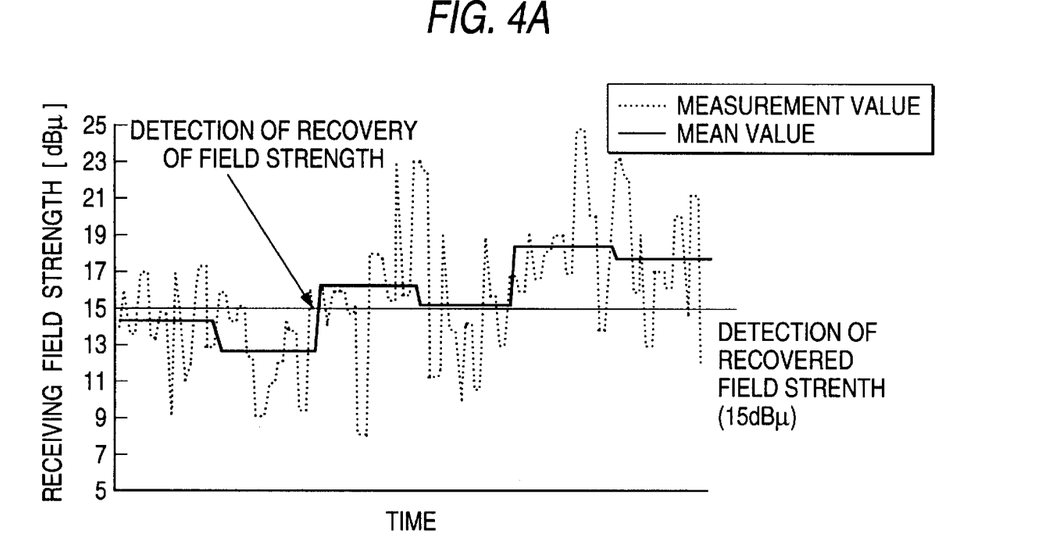
FIGS. 4A and 4B are plots showing how the cellular phone according to the first embodiment detects recovery of electric field.
Figure 4B:
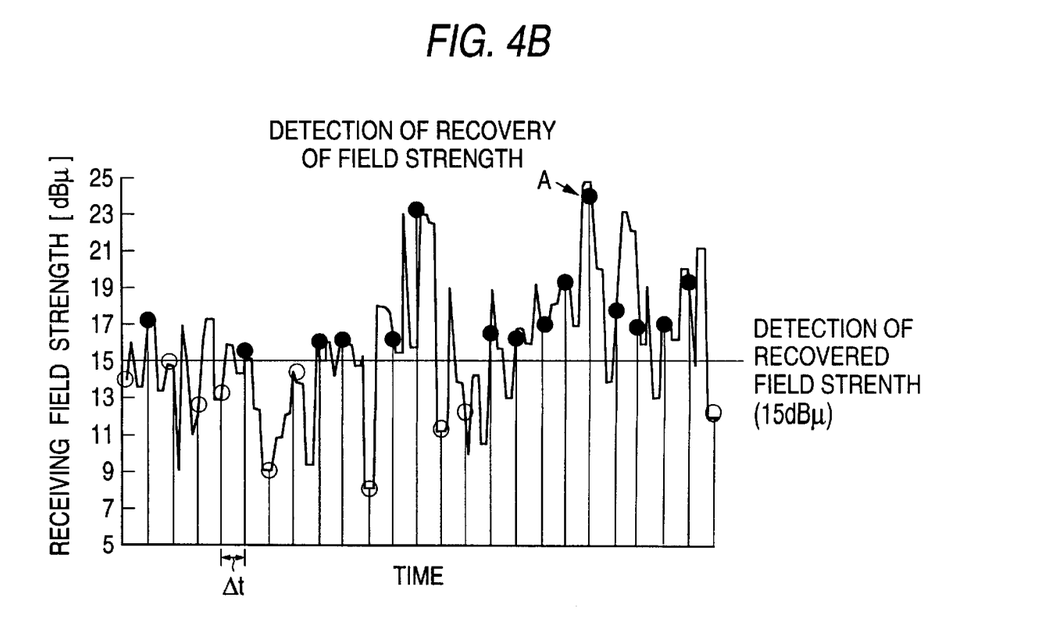

With reference to FIGS. 4A and 4B, an explanation will be given of the manner in which the field strength is determined. As shown in FIG. 4A, one method is to measure receiving field strength at given intervals and to produce a mean value of a plurality of measurement values. In FIG. 4A, each of horizontal portions of thick solid line indicates a mean value of values measured during the period of time corresponding to the length of the horizontal portion. The processing section 14 determines that the field strength has recovered to its original state when the field strength returns to a certain value at which the field strength can be decided to have recovered (e.g., field strength for recovery detection purpose; 15 dB).

Under a method shown in FIG. 4B, the field strength is decided to have recovered to its original state when a measurement value exceeding a recovery detection field strength is continually detected a given number of times [five times in the example shown in FIG. 4B as indicated by reference symbol A] as a result of measurement of the received field strength at given intervals. The method of determining the recovery of field strength is not limited to the foregoing method.

Figure 3A:
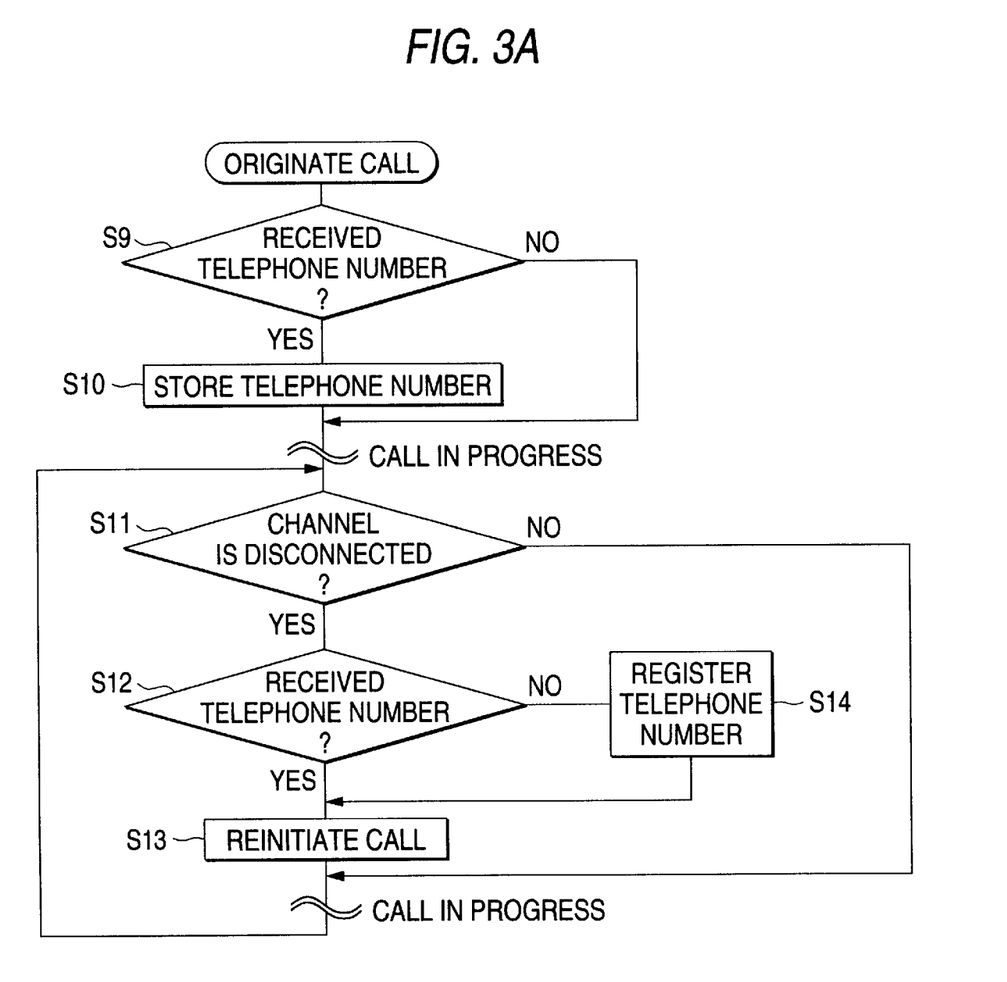
FIGS. 3A and 3B are flowcharts showing procedures for call reestablishment when the cellular phone according to the first embodiment receives an incoming call.
Figure 3B:
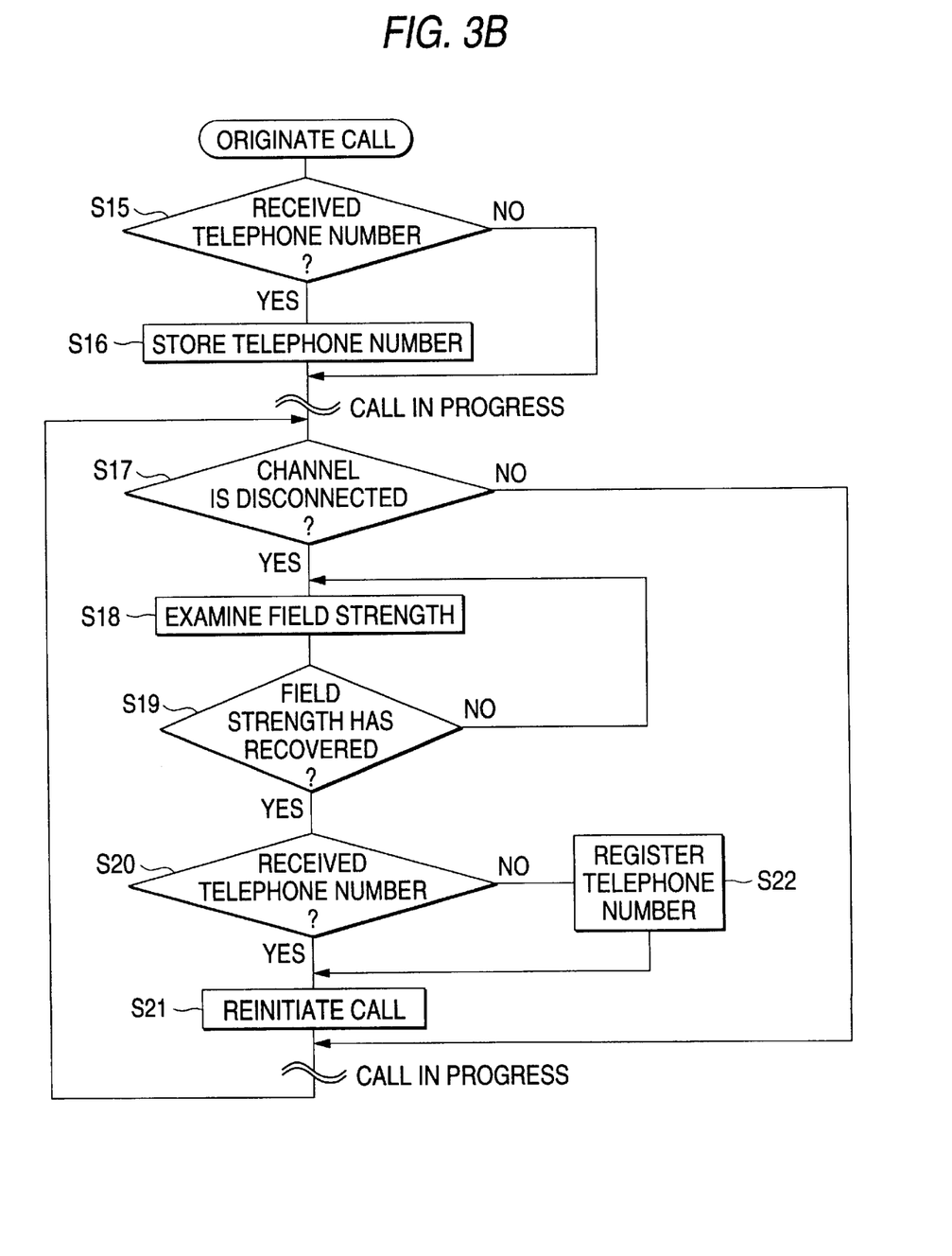

In contrast, if the cellular phone receives a call, the cellular phone will reinitiate a call according to the procedures such as those shown in FIG. 3A or 3B.

FIG. 3A shows procedures which are set so as to cause the cellular phone to immediately reinitiate a call after disconnection of the channel. In the procedures, Step 9: If there is an incoming call and if the cellular phone has received the telephone number of a calling party therefrom, Step 10: the storage section 12 stores the telephone number.

Step 11: Next, if a radio channel is disconnected after establishment of a call, Step 12: the processing section 14 decides whether or not the cellular phone is notified of the telephone number of the calling party. If the telephone unit is notified of the telephone number, Step 13: the processing section 14 reinitiates a call by dialing the telephone number stored in the storage section 12. If the cellular phone is not notified of the telephone number from the calling party, Step 14: after the user has registered the telephone number to the registration section 13, Step 13: the processing 14 reinitiates a call by dialing the thus-registered telephone number.

In contrast, in a case where the procedures are set so as to not cause the cellular phone to reinitiate a call until the field strength recovers to its original state after disconnection of the channel, the following steps will be executed as shown in FIG. 3B:

Step 15: If there is an incoming call and if the cellular phone receives a telephone number of a calling party, Step 16: the storage section 12 stores the thus-received telephone number.

Step 17: Next, if a radio channel is disconnected after establishment of a call, Step 18: information received from the radio section 10 is transmitted to the processing section 14 by way of the control section 11, and the processing section 14 conducts a study on the field strength on the basis of the information.

Step 19: If the processing section 14 decides that the field strength has recovered to its original state, Step 20: the processing section 14 determines whether or not the cellular phone is notified of the telephone number of the calling party. If the cellular phone is already provided with the telephone number, Step 21: the processing section 14 reinitiates a call by dialing the telephone number stored in the storage section 12. In contrast, if it is decided in step 20 that the cellular phone is not yet notified of the telephone number of the calling party therefrom, Step 22: after the user has registered the telephone number to the registration section 13, Step 23: the processing section 14 reinitiates a call by dialing the thus-registered telephone number.

Making a decision on the presence/absence of acknowledgment of a telephone number in step 12 or 20 and registration of a telephone number in step 14 or 22 may be carried out prior to the field strength recovery determination (step 19) or subsequent to a decision on the presence/absence of acknowledgment of a telephone number (step 9 or 15). In short, if the cellular phone is not notified of the telephone number of the calling party when there is an incoming call from the calling party, the user may register the telephone number of the calling party at any moment. However, if the user does not register the telephone number of the calling party in the cellular phone, a call will not be reinitiated.

As mentioned previously, even in a case where an incoming call is disconnected because of deterioration of the field strength, the cellular phone according to the first embodiment automatically reinitiates a call when the field strength recovers to its original state, so long as the cellular phone is notified of a telephone number of a calling party. Further, even in a case where the cellular phone is not notified of the telephone number of the calling party, the cellular phone automatically reinitiates a call at a point in time when the field strength recovers to its original state by registration of the telephone number of the calling party by the user, thus enabling immediate reestablishment of a call.

(Second Embodiment)

A cellular phone according to a second embodiment of the present invention is capable of notifying the user of the fact that the telephone number of the calling party is not received from the calling party when there is an incoming call from the same.

Figure 5:
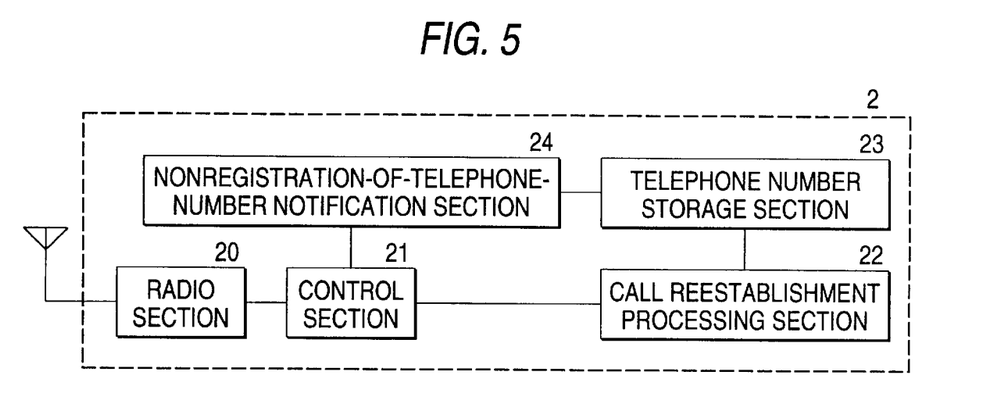
FIG. 5 is a block diagram showing the configuration of a cellular phone according to a second embodiment of the present invention.

As shown in FIG. 5, the cellular phone comprises a radio section 20 which modulates a signal to be transmitted and demodulates a received signal; a control section 21 which controls the radio section 20 so as to perform origination of a call, receipt of an incoming call, or communication; a telephone number storage section 23 (hereinafter simply referred to as a "storage section") which stores a telephone number of a called party at the time of origination of a call and which stores a telephone number of a calling party received therefrom together with an incoming call; a call reestablishment processing section 22 (hereinafter simply referred to as a "processing section") which automatically reinitiates a call; and a nonregistration-of-telephone-number notification section 24 (hereinafter simply referred to as a "notification section") for notifying the user of the fact that the cellular phone is not notified of the telephone number of the calling party at the time of arrival of an incoming call.

If the cellular phone according to the present embodiment is notified of the telephone number of the calling party at the time of arrival of an incoming call, the same operations as those performed in the first embodiment will be carried out. In contrast, if the cellular phone is not notified of the telephone number, the notification section 24 illuminates light-emission means immediately after arrival of an incoming call, thus informing the user of the telephone number being not received from the calling party.

Accordingly, the user can become aware of his cellular phone being incapable of reinitiating a call if the radio channel is disconnected.

The user may be notified of nonreceipt of the telephone number of the calling party before the radio channel is disconnected or before a call is reinitiated. Further, in order to notify the user, there may be employed a method of indicating characters or symbols on display means or of actuating a motor to produce vibration or sounds.

Further, the second embodiment may be combined with the first embodiment by providing the cellular phone with the registration section 13 and the notification section 24 so as to enable the user⌐ to which the notification section 24 notifies nonreceipt of a telephone number from a calling party at the time of arrival of an incoming call⌐ to register the telephone number of the calling party to the registration section 13.

(Third Embodiment)

A cellular phone according to a third embodiment of the present invention is to inform the user of reestablishment of a call and to reinitiate a call at the will of the user.

Figure 6:
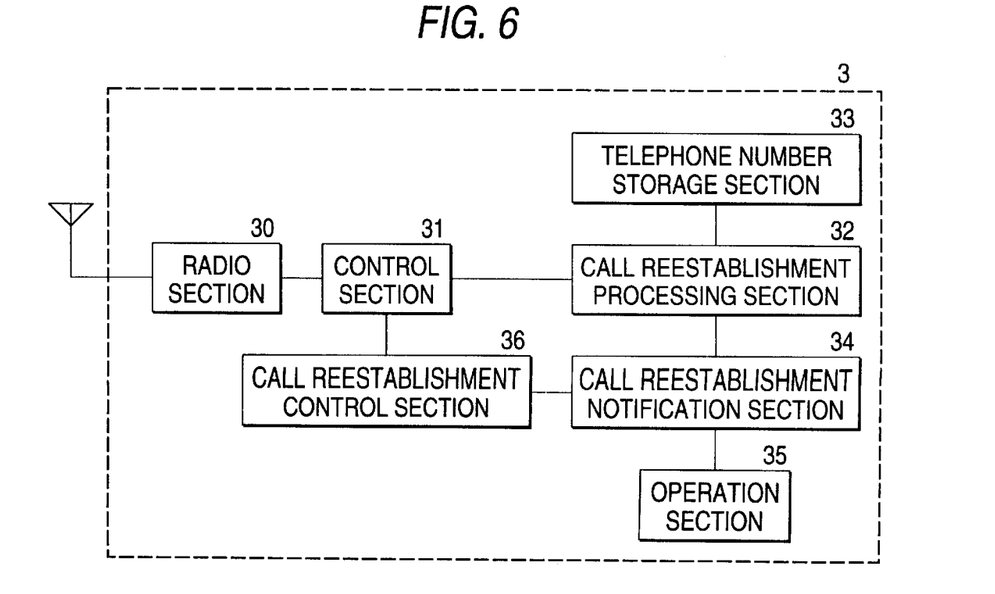
FIG. 6 is a block diagram showing the configuration of a cellular phone according to a third embodiment of the present invention.

As shown in FIG. 6, the cellular phone comprises a radio section 30 which modulates a signal to be transmitted and demodulates a received signal; a control section 21 which controls the radio section 20 so as to perform origination of a call, receipt of an incoming call, or communication; a telephone number storage section 33 (hereinafter simply referred to as a "storage section") which stores a telephone number of a called party at the time of origination of a call and which stores a telephone number of a calling party received therefrom together with an incoming call; a call reestablishment processing section 32 (hereinafter simply referred to as a "processing section") which automatically reinitiates a call; a call reestablishment notification section 34 (hereinafter simply referred to as a "notification section") which notifies the user of call reestablishment before reinitiating a call; an operation section 35 from which the user inputs an instruction concerning call reestablishment; and a call reestablishment control section 36 (hereinafter simply referred to as a "control section") which aborts the reestablishment of a call unless there is an instruction concerning call reestablishment.

In a case where the cellular phone according to the present embodiment reinitiates a call immediately after disconnection of a channel or at a point in time when the field strength has recovered to its original state, the notification section 34 informs the user of reestablishment of a call through use of, e.g., light-emitting means. Subsequently, when the user actuates the operation section 35 (e.g., the user presses an operation button), the control section 36 instructs the processing section 32 to reinitiate a call, whereby a call is reinitiated. In contrast, if the user does not actuate the operation section 35, the control section 36 instructs the processing section 32 to abort call reestablishment.

As mentioned above, the cellular phone according to the third embodiment informs the user of call reestablishment. A decision as to whether or not a call is reinitiated is made at the will of the user.

It is possible to cause the notification section 34 to inform the use of call reestablishment by indicating characters or symbols on display means or by causing a motor to produce vibration or sounds. Further, the operation section 35 may be actuated by means of another instruction, such as the user's voice, in place of pressing action.

(Fourth Embodiment)

A cellular phone according to a fourth embodiment aborts reestablishment of a call when the field strength remains in an unrecovered state over a long period of time.

Figure 7:
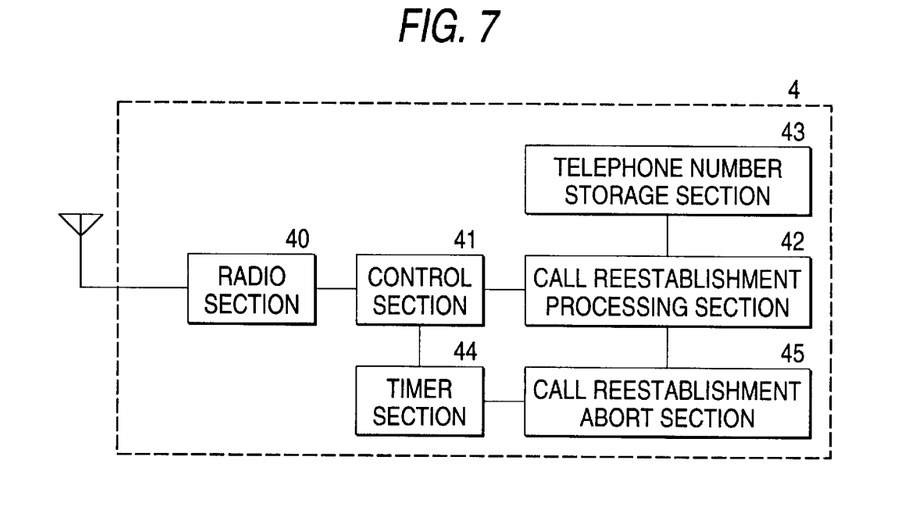
FIG. 7 is a block diagram showing the configuration of a cellular phone according to a fourth embodiment of the present invention (part 1)

As shown in FIG. 7, in addition to a radio section 40, a control section 41, a telephone number storage section 43, and a call reestablishment processing section 42, the cellular phone comprises a timer section 44 which measure time from the instant of disconnection of a radio channel; and a call reestablishment abort section 45 (hereinafter simply referred to as a "abort section") which compares preset reference time with the time measured by the timer section 44, instructing the processing section 42 to abort call reestablishment when the measured time exceeds the reference time.

In the foregoing cellular phone, when the radio channel is disconnected, a timer of the timer section 44 is activated by an instruction from the control section 41. The call reestablishment abort section 45 compares the preset reference time with a timer value of the timer section 44, instructing the processing section 42 to abort call reestablishment when the timer value becomes longer than the reference time.

The cellular phone according to the fourth embodiment can be prevented from waiting for call reestablishment for an unnecessarily long period of time.

Figure 8:
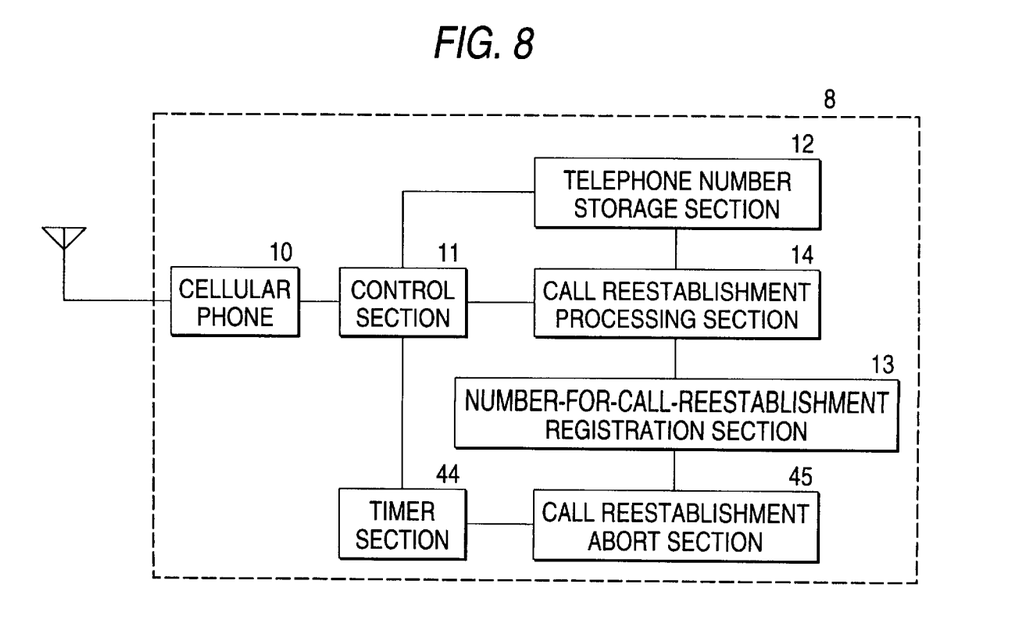
FIG. 8 is a block diagram showing the configuration of a cellular phone according to the fourth embodiment of the present invention (part 2)
Figure 9:
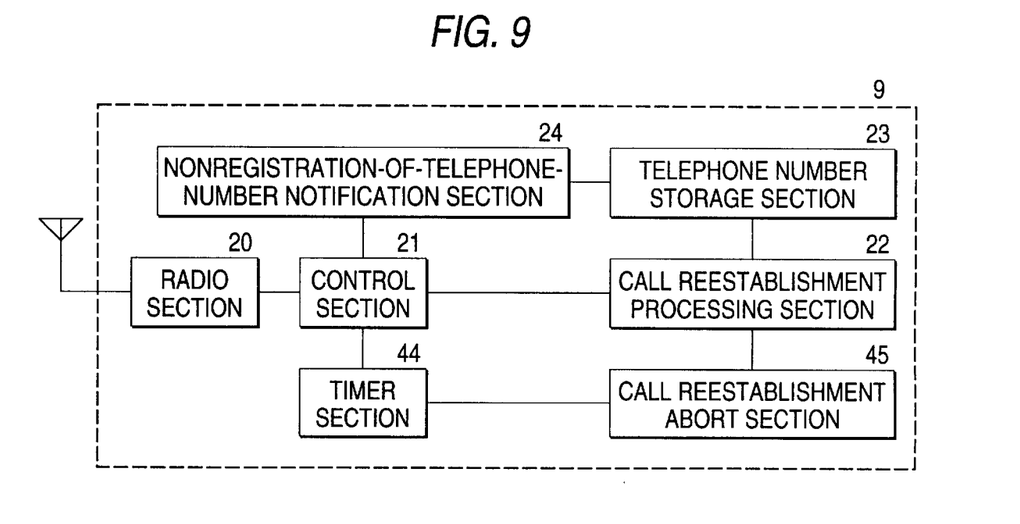
FIG. 9 is a block diagram showing the configuration of a cellular phone according to the fourth embodiment of the present invention (part 3)

FIG. 8 shows the cellular phone according to the first embodiment which is further provided with the timer section 44 and the abort section 45. Further, FIG. 9 shows the cellular phone according to the second embodiment which is provided with the timer section 44 and the abort section 45. Addition of the foregoing features to the cellular phones according to the previous embodiments enables the telephone units to abort call reestablishment if they are in a standby condition for an excessively long period of time.

(Fifth Embodiment)

A cellular phone according to a fifth embodiment is capable of changing the reference time used for aborting call reestablishment.

Figure 10:
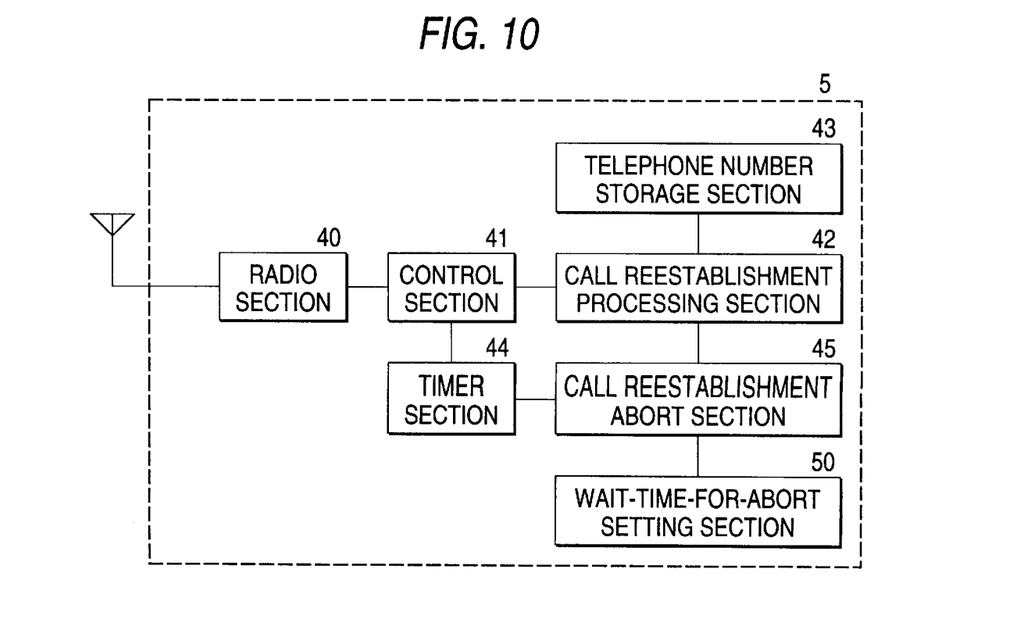
FIG. 10 is a block diagram showing the configuration of a cellular phone according to a fifth embodiment of the present invention.

As shown in FIG. 10, the cellular phone has a wait-time-for-abort setting section 50 which sets the reference time from when a radio channel is disconnected to when call reestablishment is aborted. In other respects, the cellular phone according to the fifth embodiment is the same in structure as that described for the fourth embodiment (shown in FIG. 7).

In the cellular phone, the user sets the reference time from when the radio channel is disconnected to when call reestablishment is aborted, through use of the wait-time-for-abort setting section 50.

When the radio channel is disconnected, the control section 41 instructs the timer of the timer section 44 to start. The abort section 45 compares the reference time set by the user with the timer value of the timer section 44, instructing the processing section 42 not to reinitiate a call.

As mentioned previously, the cellular phone according to the fifth embodiment allows the user to set to a desired value the time that elapses before aborting call reestablishment.

(Sixth Embodiment)

A cellular phone according to a sixth embodiment of the present invention informs the user of abortion of call reestablishment.

Figure 11:
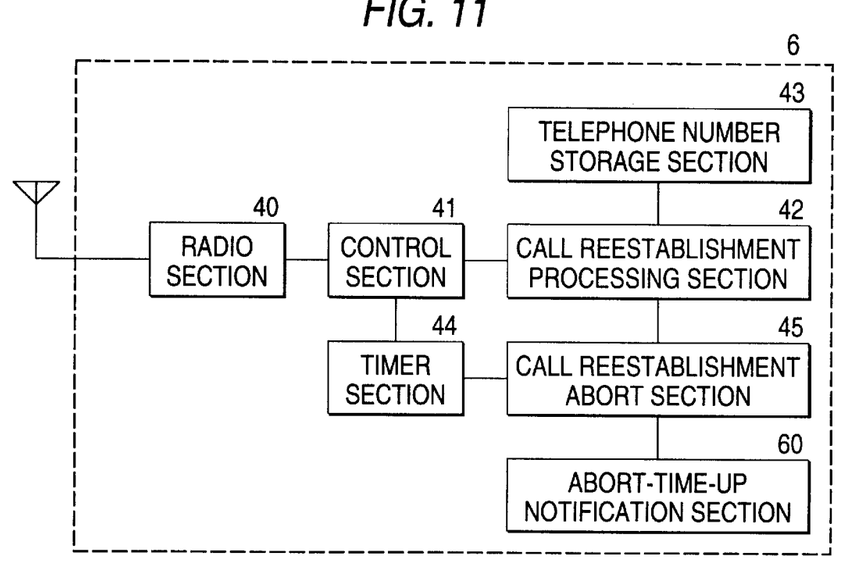
FIG. 11 is a block diagram showing the configuration of a cellular phone according to a sixth embodiment of the present invention (part 1)

As shown in FIG. 11, the cellular phone has an abort-time-up notification section 60 which notifies the user of the time of abortion of call reestablishment being up. In other respects, the cellular phone according to the sixth embodiment is the same in structure as that described for the fourth embodiment (shown in FIG. 7).

As mentioned previously, when the time of abortion of call reestablishment is up, the abort section 45 aborts call reestablishment in the manner as mentioned previously. Before abortion of call reestablishment, the notification section 60 informs the user of the time of abortion of call reestablishment being up, by illuminating, e.g., a lamp.

The user may be informed of the time of abortion of call reestablishment being up, through use of vibration or acoustic means.

Figure 12:
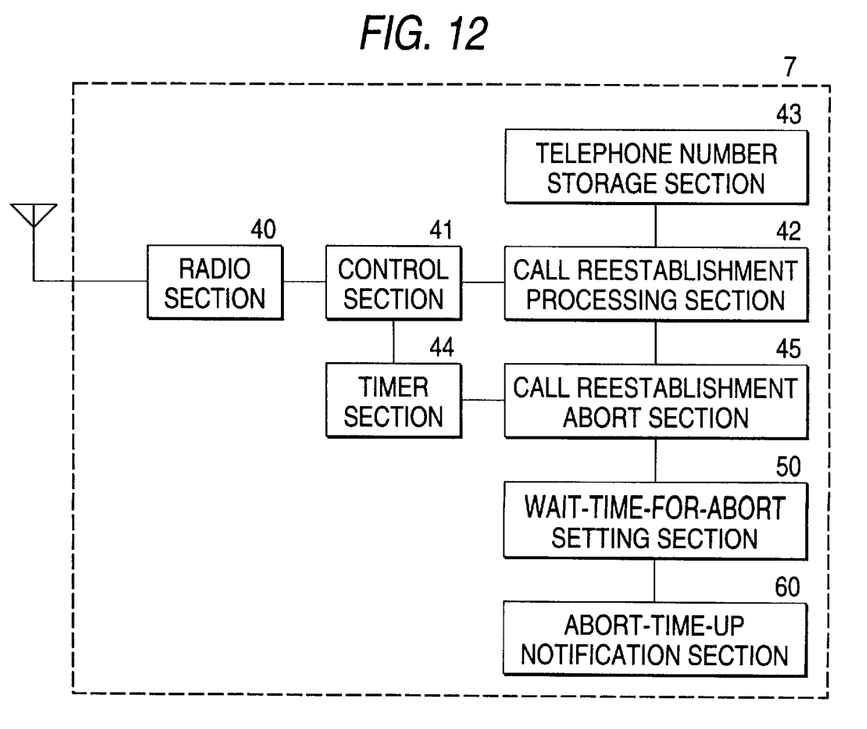
FIG. 12 is a block diagram showing the configuration of a cellular phone according to the sixth embodiment of the present invention (part 2)

FIG. 12 shows the cellular phone according to the fifth embodiment (shown in FIG. 10) having the notification section 60 added thereto. In a case where call reestablishment is aborted when the call reestablishment wait time set by the user is up, the user can be informed of the wait time being up.

(Seventh Embodiment)

A cellular phone according to a seventh embodiment measures the time that elapses from when a radio channel is disconnected, so as to include the time during which the power to the overall telephone unit is cut.

Figure 13:
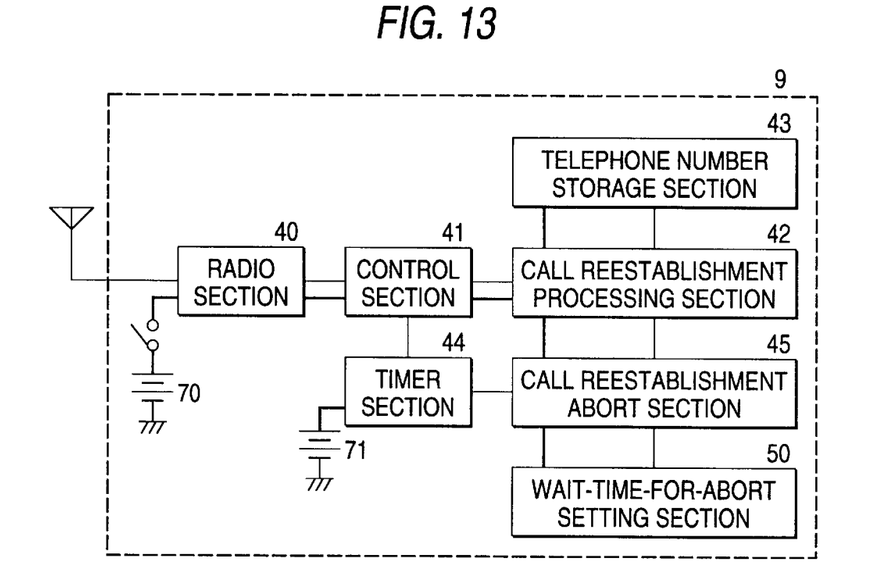
FIG. 13 is a block diagram showing the configuration of a cellular phone according to a seventh embodiment of the present invention (part 1)

As shown in FIG. 13, the cellular phone comprises a main body power line 70 which supplies power to the radio section 40, to the control section 41, to the telephone number storage section 43, to the call reestablishment processing section 42, to the call reestablishment abort section 45, and to the wait-time-for-abort setting section 50 and a timer power line 71 which supplies power to the timer 44, as well as the radio section 40, the control section 41, the telephone number storage section 43, the call reestablishment processing section 42, the timer section 44, the call reestablishment abort section 45, and the wait-time-for-abort setting section 50.

When the telephone unit is in a nonconversational mode, the main body power line 70 is intermittently turned on or off in order to save power consumption. In contrast, the timer power line 71 is constantly held in an ON state.

When the radio channel is disconnected, the control section 41 instructs the timer of the timer section 44 to be activated. The timer of the timer section 44 which receives power from the timer power line 71 keeps counting time even when the main body power line 70 is turned off and the sections other than the timer section 44 are in an inactive state.

The abort section 45 is activated when the main body power line 70 is shut off, comparing the reference time set by means of the wait-time-for-abort setting section 50 with the timer value of the timer section 44. If the timer value is longer than the reference time, the abort section 45 instructs the processing section 42 not to reinitiate a call.

As mentioned previously, the cellular phone is provided the main body power line 70 and the timer power line 71 separately from each other. Even if the telephone unit intermittently receives an incoming call, the telephone unit is capable of making a decision as to whether or not the time of abortion of call reestablishment is up even during the period of time including the time over which power to the overall telephone unit is shut off.

Figure 14:
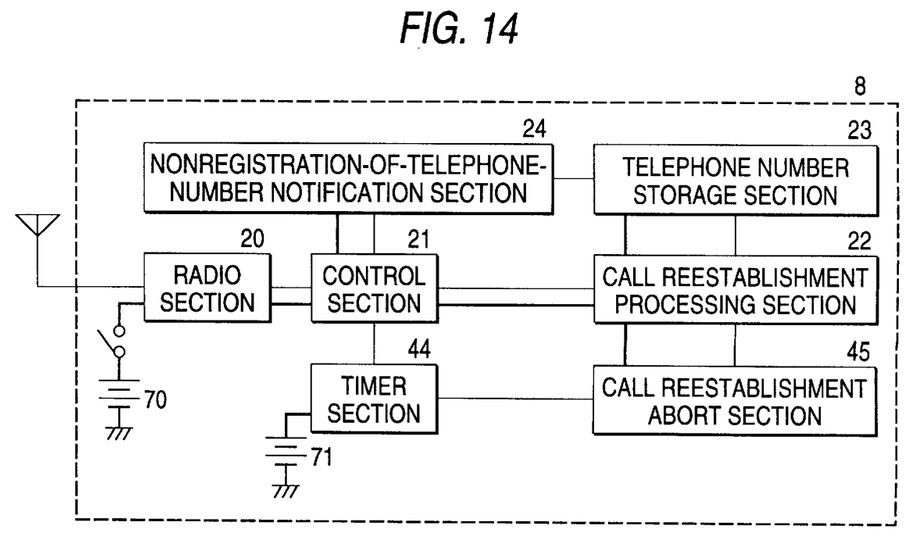
FIG. 14 is a block diagram showing the configuration of a cellular phone according to the seventh embodiment of the present invention (part 2)
Figure 15:
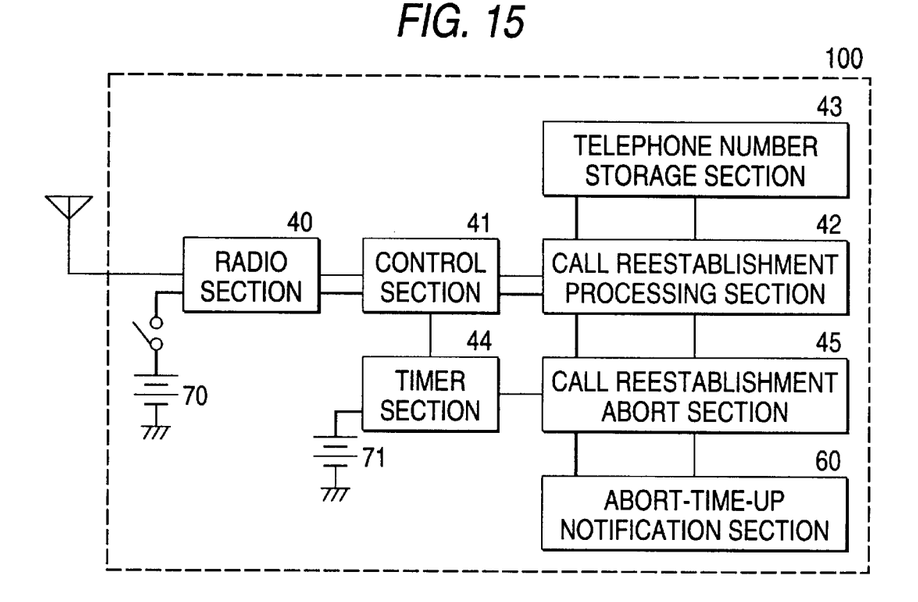
FIG. 15 is a block diagram showing the configuration of a cellular phone according to the seventh embodiment of the present invention (part 3)
Figure 16:
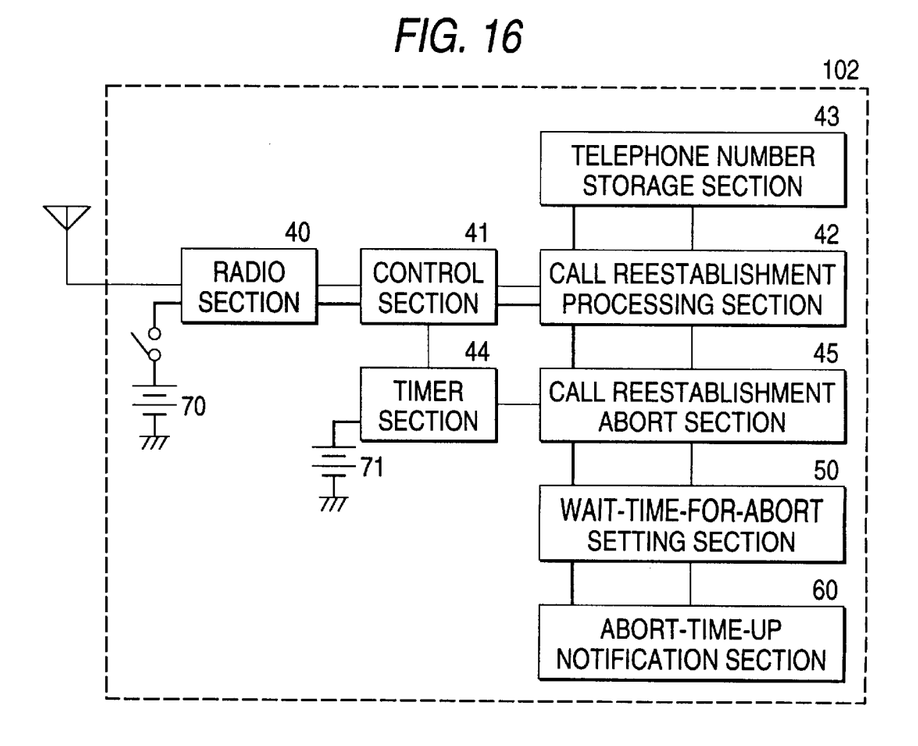
FIG. 16 is a block diagram showing the configuration of a cellular phone according to the seventh embodiment of the present invention (part 4).

FIG. 14 shows the cellular phone according to the fourth embodiment that is shown in FIG. 9 and that is provided with the main body power line 70 and the timer power line 71 separately from each other. FIG. 15 shows the cellular phone according to the sixth embodiment that is shown in FIG. 11 and that is provided with the main body power line 70 and the timer power line 71 separately from each other. FIG. 16 shows the cellular phone according to the sixth embodiment that is shown in FIG. 12 and that is provided with the main body power line 70 and the timer power line 71 separately from each other. Even these cellular phones are also capable of determining whether or not the time of abortion of call reestablishment is up, even during the period of time over which the power to the overall telephone unit is shut off.

As is evident from the foregoing descriptions, the cellular phone according to the present invention is capable of automatically reinitiating a call if a radio channel is disconnected because of deterioration of field strength even when the telephone unit receives an incoming call.

Further, if the cellular phone is incapable of reinitiating a call, the user is capable of informing the user of the impossibility of call reestablishment.

When a call is reinitiated, the telephone unit informs the user of call reestablishment, thus allowing the user to select call reestablishment at his will.

In a case where the time that elapses before a call is reinitiated indiscriminately becomes longer, the telephone unit can abort call reestablishment and also allows the user to arbitrarily set the time that lapses before call reestablishment is aborted. Further, in a case where call reestablishment is aborted, the telephone unit is capable of informing the user of abortion of call reestablishment.

Even in a case where the cellular phone intermittently receives an incoming call, the telephone unit is capable of determining whether or not the time of abortion of call reestablishment is up, even during the time including a period of time over which the overall telephone unit is in an inactive state.

What is claimed is:

1. A cellular phone which, when a communication channel is disconnected because of deterioration of field strength while a call is in progress, waits for recovery of the field strength and reinitiates a call, the cellular phone comprising:

telephone number storage means for storing a telephone number of a called party when originating a call or storing a telephone number of a calling party when receiving an incoming call;

number-for-call-reestablishment registration means for storing a telephone number of the called/calling party input by the user; and call reestablishment processing means for automatically reinitiating a call by dialing the telephone number stored in the telephone number storage means or the number-for-call-reestablishment registration means.

2. A cellular phone as claimed in claim 1, further comprising timer means for measuring the time that elapses from disconnection of the communication channel; and call reestablishment abort means for causing the call reestablishment processing means to abort call reestablishment when the field strength does not recover to its original state within a given period of time.

3. A cellular phone as claimed in claim 2, further comprising wait-time-for-abort setting means for setting the time that lapses before call reestablishment is aborted.

4. A cellular phone as claimed in claim 2, further comprising abort-time-up notification means for notifying the user of abortion of call reestablishment when call reestablishment is aborted.

5. A cellular phone as claimed in claim 2, wherein the timer means continues measuring the time that lapses from when the communication channel is disconnected even during the period of time over which power to the main body of the cellular phone is shut off.

6. A cellular phone which, when a communication channel is disconnected because of deterioration of field strength while a call is in progress, waits for recovery of the field strength and reinitiates a call, the cellular phone comprising:

telephone number storage means for storing a telephone number of a called party when originating a call or storing a telephone number of a calling party when receiving an incoming call;

call reestablishment processing means for automatically reinitiating a call by dialing the telephone number stored in the telephone number storage means; and notification means for notifying the user that the telephone number of the calling party was not received when the incoming call was received from the calling party.

7. A cellular phone as claimed in claim 6, further comprising timer means for measuring the time that elapses from disconnection of the communication channel; and call reestablishment abort means for causing the call reestablishment processing means to abort call reestablishment when the field strength does not recover to its original state within a given period of time.

8. A cellular phone as claimed in claim 7, further comprising wait-time-for-abort setting means for setting the time that lapses before call reestablishment is aborted.

9. A cellular phone as claimed in claim 7, further comprising abort-time-up notification means for notifying the user of abortion of call reestablishment when call reestablishment is aborted.

10. A cellular phone as claimed in claim 7, wherein the timer means continues measuring the time that lapses from when the communication channel is disconnected even during the period of time over which power to the main body of the cellular phone is shut off.

11. A cellular phone which, when a communication channel is disconnected because of deterioration of field strength while a call is in progress, waits for recovery of the field strength and reinitiates a call, the cellular phone comprising:

telephone number storage means for storing a telephone number of a called party when originating a call or storing a telephone number of a calling party when receiving an incoming call;

call reestablishment processing means for reinitiating a call by dialing the telephone number stored in the telephone number storage means;

call reestablishment notification means for notifying the user of call reestablishment before a call is reinitiated; and call reestablishment control means for selectively causing the call reestablishment processing means to reinitiate a call, said call reestablishment control means being operable, when the user instructs the call reestablishment control means to reestablish the call, to cause the call reestablishment processing means to reinitiate a call and, when the user fails to instruct the call reestablishment control means to reestablish the call, to cause the call reestablishment processing means to abort call reestablishment.

12. A cellular phone as claimed in claim 11, further comprising timer means for measuring the time that elapses from disconnection of the communication channel; and call reestablishment abort means for causing the call reestablishment processing means to abort call reestablishment when the field strength does not recover to its original state within a given period of time.

13. A cellular phone as claimed in claim 12, further comprising wait-time-for-abort setting means for setting the time that lapses before call reestablishment is aborted.

14. A cellular phone as claimed in claim 12, further comprising abort-time-up notification means for notifying the user of abortion of call reestablishment when call reestablishment is aborted.

15. A cellular phone as claimed in claim 12, wherein the timer means continues measuring the time that lapses from when the communication channel is disconnected even during the period of time over which power to the main body of the cellular phone is shut off.

16. A cellular phone which, when a communication channel is disconnected because of deterioration of field strength while a call is in progress, waits for recovery of the field strength and reinitiates a call, the cellular phone comprising:

- telephone number storage means for storing a telephone number of a called party when originating a call or storing a telephone number of a calling party when receiving an incoming call;
- call reestablishment processing means for automatically reinitiating a call by dialing the telephone number stored in the telephone number storage means;
- timer means for measuring the time that elapses from disconnection of the communication channel;
- call reestablishment abort means for causing the call reestablishment processing means to abort call reestablishment when the field strength does not recover to its original state within a given period of time; and
- abort-time-up notification means for notifying the user of abortion of call reestablishment when call reestablishment is aborted.

17. A cellular phone which, when a communication channel is disconnected because of deterioration of field strength while a call is in progress, waits for recovery of the field strength and reinitiates a call, the cellular phone comprising:

- telephone number storage means for storing a telephone number of a called party when originating a call or storing a telephone number of a calling party when receiving an incoming call;
- call reestablishment processing means for automatically reinitiating a call by dialing the telephone number stored in the telephone number storage means;
- timer means for measuring the time that elapses from disconnection of the communication channel; wherein the timer means continues measuring the time that lapses from when the communication channel is disconnected even during the period of time over which power to the main body of the cellular phone is shut off; and
- call reestablishment abort means for causing the call reestablishment processing means to abort call reestablishment when the field strength does not recover to its original state within a given period of time.

* * * * *